United States Patent

[11] 3,581,125

[72] Inventors John P. Arndt
Cleveland;
Edmond G. Franklin, North Canton, Ohio
[21] Appl. No. 862,342
[22] Filed Sept. 30, 1969
Division of Ser. No. 660,262
Aug. 14, 1967, Pat. No. 3,516,645
[45] Patented May 25, 1971
[73] Assignee Clevite Corporation

[54] OSCILLATOR CIRCUIT FOR ULTRASONIC APPARATUS
9 Claims, 6 Drawing Figs.

[52] U.S. Cl. ........................................................ 310/8.1, 259/1, 331/116, 331/158
[51] Int. Cl. ........................................................ H01v 7/00
[50] Field of Search ........................................................ 310/8.1; 322/2; 331/116, 154, 158, 160, 163; 259/1; 318/116

[56] References Cited

UNITED STATES PATENTS

| | | | |
|---|---|---|---|
| 3,432,691 | 3/1969 | Shoh | 310/8.1 |
| 3,440,648 | 4/1969 | Camenzino | 331/116X |
| 3,441,875 | 4/1969 | Shoh | 310/8.1X |
| 3,469,211 | 9/1969 | Shoh et al. | 331/158X |
| 3,475,698 | 10/1969 | Noe | 331/116X |
| 3,302,131 | 1/1967 | Pyatt | 331/112 |
| 3,318,578 | 5/1967 | Branson | 259/1 |
| 3,328,609 | 6/1967 | Clicques | 310/8.1 |

*Primary Examiner*—D. F. Duggan
*Assistant Examiner*—Mark O. Budd
*Attorney*—Frederic B. Schramm

ABSTRACT: An oscillator circuit is provided for ultrasonic apparatus such as ultrasonic cleaners employing a resonant transducer. The circuit includes a pair of transistors connected in series to a source of power with the transducer connected across one of the transistors in series with the primary winding of a transformer which has secondary windings connected in opposite polarity to the bases of the transistors so that one transistor is saturated while the other is nonconducting. The circuit accordingly oscillates at substantially the resonant frequency of the transducer as a result of the feedback provided by the secondary windings of the transformer.

INVENTORS.
JOHN P. ARNDT
EDMOND G. FRANKLIN
BY
ATTORNEY.

INVENTORS.
JOHN P. ARNDT
EDMOND G. FRANKLIN
BY
Fudmi B. Schramm
ATTORNEY.

OSCILLATOR CIRCUIT FOR ULTRASONIC APPARATUS

This application is a division of application Ser. No. 660,262 filed Aug. 14, 1967, now U.S. Pat. No. 3,516,645.

It is an object of the invention to provide efficient durable cleaning apparatus producing cavitation by ultrasonic vibrations in the cleaning liquid, which apparatus may be manufactured easily and economically.

Other and further objects, features and advantages of the invention will become apparent as the description proceeds.

In carrying out the invention in accordance with a preferred form thereof a substantially cylindrical sheet metal case is provided with an open top for receiving a cup-shaped stainless steel tank having a lip gasketed to the upper edge of the case to provide both a resilient mounting and a watertight, electrically insulated joint. A disc of low-loss piezoelectric ceramic material is bonded to the bottom surface of the cleaning tank with a layer of fiber glass interposed to insulate the transducer from the tank. This makes it possible to connect one side of an alternating current line directly to the transducer without producing a shock hazard for a person handling the apparatus. A low-loss epoxy resin is employed for bonding the fiber glass and the transducer to the tank.

For resilient support, rubber feet are provided for the sheet metal case. The case is preferably formed of a sheet material such as aluminum which has relatively high thermal conductivity, and portions of the outer walls of the case are bent inward to form horizontal brackets for supporting transistors utilized in a transducer-driving, switching circuit and acting as a heat sink for the transistors.

A better understanding of the invention will be afforded by following detailed description considered in conjunction with the accompanying drawings in which.

Like reference characters are utilized throughout the drawing to designate like parts.

Figure 2:
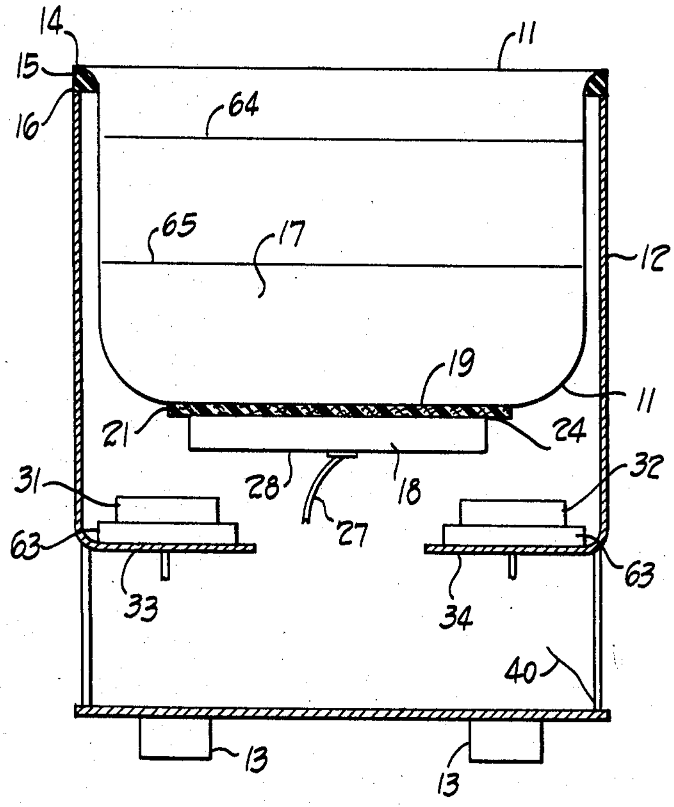
FIG. 2 is a view of a section of the apparatus cut by a vertical plane.

In the embodiment of the invention illustrated in FIG. 2, there is a receptacle or tank 11 composed of a suitable material such as stainless steel, e.g., for holding a liquid for subjecting material to be cleaned to the effect of ultrasonic vibration. Preferably the tank 11 is resiliently mounted. For example, a supporting case 12 may be provided having resilient feet 13 composed of a suitable material such as natural or synthetic rubber, for example. In order that the tank may be resiliently mounted in the case 12 with a liquidtight seal thereto, the tank 11 is preferably formed with a lip 14 resting upon a gasket 15 at the upper edge 16 of the case 12. For providing an effective resilient seal, a suitable material such as silicone rubber is employed for the gasket 15. The case 12 in the embodiment illustrated is composed of sheet material, preferably a material having good thermal conductivity. For example, case 12 may be composed of spun or drawn aluminum sheet material.

For producing ultrasonic vibration of the tank 11 and the contained liquid 17 a suitable transducer 18 is provided. It is essential that the transducer 18 be composed of relatively low loss material in order that adequate driving power may be obtained without excessive heating of the transducer or material used for bonding it to the tank 11. Although the invention is not limited to the use of a particular composition, it has been found that satisfactory results are accomplished by employing a polarized dielectric ceramic composed of lead titanate and lead zirconate with additives in proportions described in U.S. Pat. No. 2,906,710 issued to Kulcsar and Cmolik and manufactured in the manner described in said patent. For example, a disc may be employed comprising solid solution of lead zirconate, lead titanate and additives. An alkaline earth element such as calcium and strontium is substituted for 1 to 30 atom-percent of the lead. The mole ratio of lead and alkaline earth zirconate to lead and alkaline earth titanate in the solid solution is in the range from 65:35 to 45:55. A still lower loss material may be employed, if desired, such as lead titanate, zirconium titanate with additives and substituents as described in the copending application of Don Berlincourt and Lawrence R. Sliker Ser. No. 651,875 filed July 7, 1967 and U.S. Pat. No. 3,068,177 issued to Sugden.

Preferably the transducer 18 is in the form of a disc polarized transversely and driven at a frequency such that the drive frequency corresponds to the resonant vibration frequency of the disc in its radial mode. Accordingly, the tank 11 is formed with a suitable flat or plane surface to which the disc-shaped transducer 18 may be bonded. As shown, the tank 11 is in the form of a cup having a flat bottom 19 and the disc 18 is chosen with a diameter of the same order as the diameter of the planar surface of the bottom 19. It is essential that a low-loss bonding material be employed for securing the transducer 18 to the bottom surface 19 of the tank 11 to prevent the generation of such losses in the bonding material as to heat it to the softening point. Preferably a low-loss type of epoxy resin is employed such as that for example sold under the trade name ECCO Bond 045 (rigid formulation: 1 part catalyst 015, 2 parts ECCO Bond 045), or Shell Epon 6.

In order to avoid the possibility of a shock being received by a person touching the tank when one side of the alternating current line is connected to the transducer, the transducer 18 is insulated from the bottom 19 of the tank 11 by interposing a sheet of fiber glass cloth 21 which is in turn bonded both to the tank bottom 19 and the upper surface 23 of the transducer 18 by the low-loss epoxy resin or cement material. Open mesh fiber glass cloth such as is used in auto body repairing is employed with a thickness, for example, of 0.012 inch.

Preferably in order to insure a good bond, the tank 11 is first cleaned with solvent and roughened with emery cloth before bonding. To assure a good joint, preferably pressure is maintained on the joint for a period of about 12 hours while the epoxy resin is curing. This may be accomplished by placing a weight on the disc.

Figure 4:
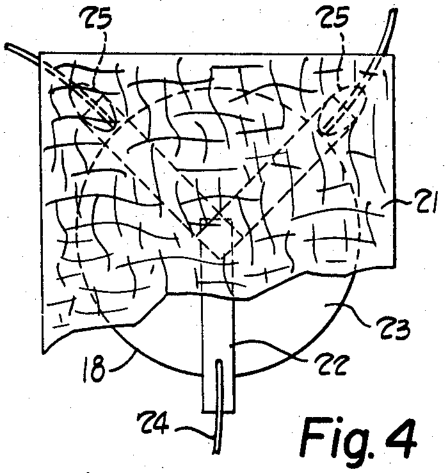
FIG. 4 is a plan view of the transducer and connections.

It will be understood that piezoelectric transducers such as the disc 18 are customarily fabricated with silvered surfaces as shown in FIG. 4.

For making connections to the surfaces of the piezoelectric transducer 18 conducting strips 22 are applied to the upper silvered surface 23, the cemented surface. For example, in the case of a stainless steel cleaning tank having internal dimensions of 3½ by 3½ inches, 2½ inches deep, a disc of piezoelectric material 2⅛ inches in diameter and ¼ inch thick is cemented to the bottom of the tank and in this case the electrical connections at the cemented surface may be made by 0.002-inch silver foil strips placed at 120° spacing. Although soldering to the silvered surface 23 on the disc is not necessary, this is considered advantageous in production work.

Superior results are obtained when the tank has rounded corners, particularly around the bottom edge of the tank and the junction between the sidewalls and the bottom which carries the transducer disc. Although the invention is not limited to a particular radius, satisfactory results have been obtained with a radius of about ¼ inch to ½ inch. Operation has been found to be inferior when the radius is a small as 1/32 inch. In the case of 2½ inch tank the radius is of the order of 10 percent of the depth of the tank.

Although we are not able to explain the exact theory involving this feature, we believe that when the corners are rounded, more ultrasonic energy is transmitted up the sides of the tank into the liquid, thereby improving the distribution of energy throughout the tank.

Better cleaning is ordinarily obtained with relatively low vibration frequencies, preferably relatively close to the audible limit of frequency. Such low frequency has heretofore been difficult to obtain by the operation of the transducer disc in the thickness mode. Such low frequencies would ordinarily require a very thick resonant oscillator disc or the attachment of a mass to lower the frequency. A thin disc with a large diameter makes it possible to get along with very little piezoelectric material because the diameter of the disc controls the frequency.

Increasing the diameter of the piezoelectric disc makes it possible also to transfer a greater amount of power to the oscillator disc.

In order to enable the utilization of a larger diameter disc, the disc may, if desired, be made of a greater diameter than the bottom plane surface of the tank.

For reliability, lead wires 24 are connected to all three strips 22 and the foil wire connections are buried in epoxy resin 25 to prevent the foil from fraying by ultrasonic vibration. For the second electrode a flexible wire 27 is soldered to the lower or outer silvered surface 28 of the disc 18.

A suitable electrical circuit is utilized for applying voltage to the conductors 24 and 27 of the requisite frequency for maintaining ultrasonic vibration. Preferably a switching circuit is utilized employing a pair of series-connected transistors 31 and 32. For mounting the transistors 31 and 32, shelves or brackets are formed in the case 12 by cutting, and bending in portions 33 and 34 of the sheet material. Since the case 12 is composed of a good thermal conductor such as aluminum sheet material, the transistor supporting shelves 33 and 34 serve as heat sinks for the transistors.

Figure 1:
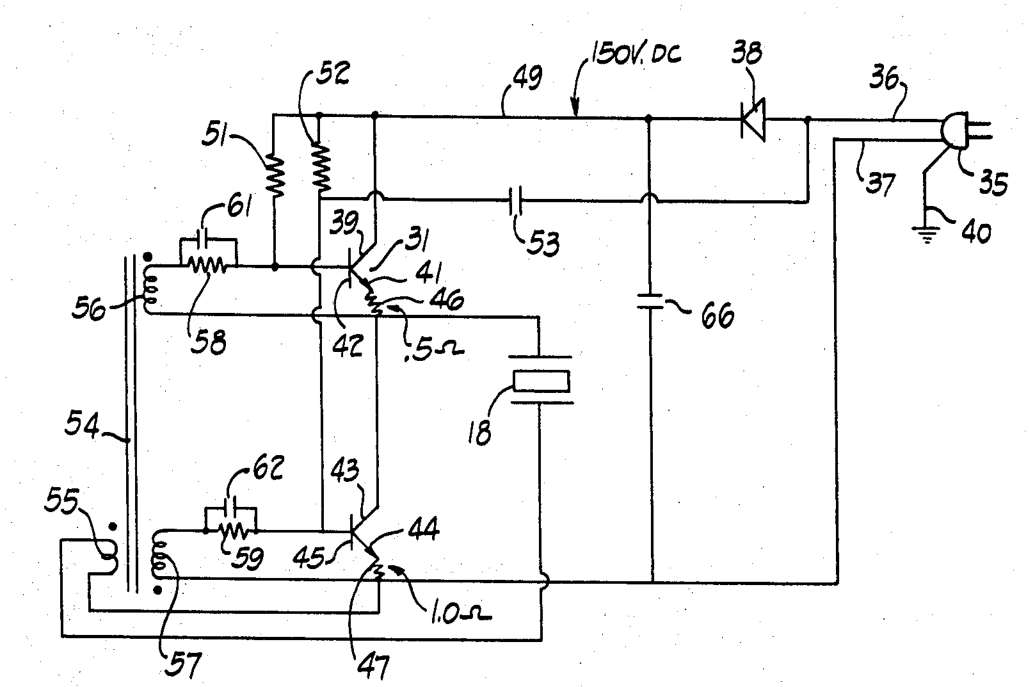
FIG. 1 is a circuit diagram of the driving circuit for the transducer employed in the cleaning apparatus.

A switching circuit for driving the piezoelectric transducer 18 is illustrated in FIG. 1. Utilizing a standard 115-volt alternating current as source, 100 to 150 volts of direct current is available in the circuit. The AC supply is represented by a cap 35 which is preferably of a three-wire type in order that a mechanical ground wire 40 can be brought out in addition to live conductors 36 and 37. The transistors 31 and 32 are connected to the conductors 36 and 37 in series with a rectifier 38. Although the invention is not limited to the use of NPN transistors, in the circuits shown by the way of illustration the transistors 31 and 32 are of the NPN type. The transistor 31 has a collector 39, an emitter 41 and a base 42. Similarly, the transistor 32 has a collector 43, an emitter 44 and a base 45.

For starting the switch circuit positive current bias is provided for the bases. This is accomplished in the circuit illustrated by providing resistors 51 and 52 each connected by a conductor 49 to the rectifier 38 and connected to the bases 42 and 45 respectively. For supplying an AC starting signal, a condenser 53 may be connected between the AC supply line 36 and the base 45 of the transistor 32 across which the piezoelectric transducer 18 is connected.

For driving the bases 42 and 45 a transformer 54 is provided, having a primary winding 55 in series with the piezoelectric transducer 18 and a pair of secondary windings 56 and 57. As indicated in the drawing, the transformer is a current stepdown transformer. The secondary winding 56 is connected between the base 42 and the emitter circuit of the transistor 31 and the secondary winding 57 is connected between the base 45 and the emitter circuit of the transistor 32. As indicated by the conventional dot representation in the drawing, the polarities of the windings are such that the windings 56 and 57 are oppositely connected to the transistor bases and the upper ends of the windings 55 and 56 are of the same polarity.

Emitter resistors 46 and 47 are provided in series with the emitters 41 and 44 respectively. The circuits of the secondary windings 56 and 57 include base resistors 58 and 59 respectively. For improving the waveform of the switching circuit speedup capacitors 61 and 62 are connected across the base resistors 58 and 59 respectively. The polarities of the secondary windings 56 and 57 are reversed on the two transistors 31 and 32; so that one is driven on while the other is driven off.

For safety purpose and reducing the shock hazard, the mechanical ground wire 40 from the cap 35 is run to the aluminum case 12.

The apparatus is designed for operation at approximately 43 kilocycles. At this frequency the transformer 54 may be of somewhat lighter and less expensive construction than transformers designed for power frequencies electric central stations and relatively few turns of winding are required. In the particular embodiment illustrated for a ratio of 1 to 10 current stepdown, the primary winding 55 may have a single turn and each of the two secondary windings, 56 and 57 may have 10 turns.

The transistors 31 and 32 are electrically insulated from the shelves or brackets 33 and 34 upon which they are mounted although arranged for good thermal conductivity to the heat-sink material of the case 12. This may be accomplished by employing mica washers 63 coated with silicone grease as insulators.

Preferably, the preferred depths of liquid in tank 11 are indicated by scribed lines 64 and 65.

Although the apparatus is not limited to the use of water as a liquid in the cleaning tank 11, ordinarily water will be employed as the most economical liquid.

Since the energy required to cavitate water decreases as the water temperature increases, it is desirable to use lukewarm water in the cleaning tank 11. A suitable wetting agent should be added to the water. For example, a readily available household detergent such as a dishwashing detergent sold under such trade names as Joy, Liquid Lux, or the like may be employed. A few drops which should be stirred in before operating the unit, are all that is needed. The water cavitates more readily after it is degassed. A few minutes operation will accomplish this.

Figure 3:
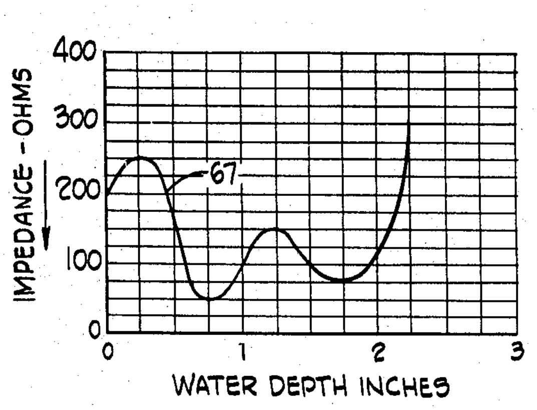
FIG. 3 is a graph illustrating the relationship between transducer impedance and depth of liquid in the cleaning tank.

Since the piezoelectric disc 18 is closely coupled to the tank and the water load, the water depth in the tank affects the power transferred to the water and the frequency of the transducer 18. The variation of the transducer impedance with water depth is shown by the sinuous curve 67 in the graph of FIG. 3. In the case of the embodiment with the dimensions given by way of illustration, the low impedance points are water depths of approximately ¾ inch and 1¾ inches. In FIG. 3 the impedance in ohms is plotted vertically against water depth in inches plotted in a horizontal direction.

The cleaner should be operated at one or the other of these low impedance points. For example, the ¾-inch depth (which gives maximum cavitation) is suitable for cleaning dentures, shaver heads, jewelry, fountain pen points, spark plugs, small tools, etc. The 1¾ inch depth (or higher) is usable for eyeglasses, silverware (which is cleaned first at one end and then at the other), kitchen tools, etc.

For most cleaning a simple detergent solution such as Joy is sufficient. However, since it must be realized that ultrasonic cleaning is a scrubbing process, the proper solvent which can attack or dissolve the particular soil is desirable.

Although the invention has been described as carried out by employing a single cleaning tank with the ultrasonic transducer secured to the lower surface of the tank, it will be understood that the invention is not limited thereto and does not exclude the use of a tank with the transducer mounted on the side nor does the invention exclude the use of a pair of tanks mounted side by side with a transducer between them. If two tanks were used in this manner, each tank would tune the transducer and one tank would be used for cleaning and the other for rinsing.

The invention is not limited to the use of apparatus with particular electrical or mechanical dimensions. However, satisfactory results have been obtained when the parts were of the type or dimensions listed as follows:

Transistors 31 and 52—Delco DTS-410
Rectifier 38—RCA Silicon rectifier IN-3194
Filter Capacitor 66—Sprague TVA1414 50 mf., 150 v.
Starting Capacitor 53—1,000 μμf.
Speedup Capacitors 61 and 62—Sprague 2249-R-75 0.25 μf.
Transformer 54—Torid—Indiana General CF 108, Composition H
Base Resistors 58 and 59—30 ohm, ¼ watt Emitter Resistor 47—1 ohm, ¼ watt
Emitter Resistor 46—0.5 ohm, ¼ watt
Biasing Resistor 51—4,700 ohms, 1 watt
Biasing Resistor 52—5,000 ohms, 4 watts
Piezoelectric Transducer 18—2⅛-inch diameter by ¼ inch thick It will be observed that preferably biasing resistors 51 and 52 differ slightly in resistance and likewise the emitter resistors 46 and 47 differ in resistance. The biasing resistor 52 for the transistor 32 which has the piezoelectric transducer 18 connected across it is made slightly greater in resistance than the other biasing resistor 51. Correspondingly, the emitter resistor 47 for the transistor 32 is made greater in resistance than the emitter resistor 46 for the transistor 31.

Figure 5:
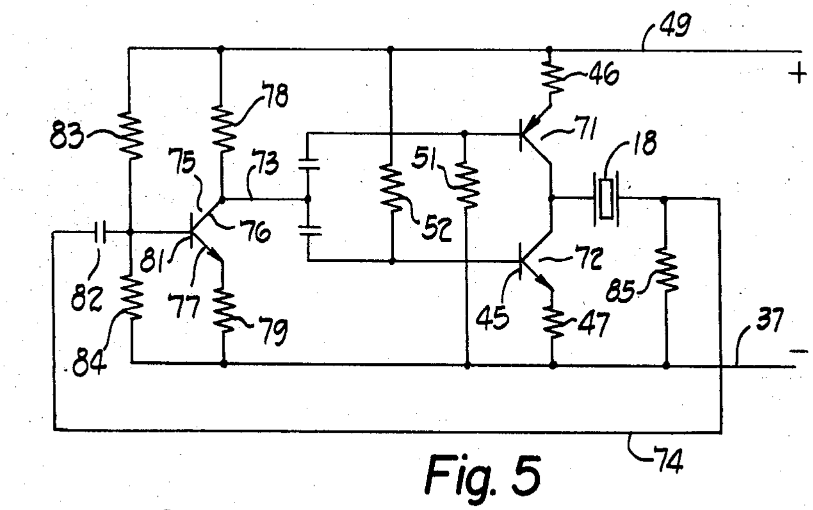
FIG. 5 is a circuit diagram of an electronic switching circuit for the transducer requiring no transformers and, FIG. 6 is a circuit diagram of a modified arrangement producing frequency modulation of the transducer oscillation.

The expense and weight of transformers may be avoided by utilizing other means for producing alternate switching of the series transistors and providing the requisite phase inversion for positive feedback to maintain oscillation. For example, as illustrated in FIG. 5, complementary transistors 71 and 72 may be employed, that is transistors of opposite types, one being a PNP and the other an NPN-type transistor. As shown the transistor 71 is a PNP transistor and the transistor 72 is an NPN transistor. In this manner a single coupling connection 73 may be employed for producing opposite effects at bases 42 and 45 of the transistors 71 and 72, respectively, so that a base signal of a given polarity will turn one transistor on and the other off.

Phase inversion in the feedback line 74 to produce a positive feedback for maintaining oscillation may also be accomplished without a transformer by utilizing a suitable phase inverter such as a phase inversion stage comprising a transistor 75 also connected between the DC input lines 49 and 37. The transistor 75 is shown as an NPN type with a collector 76 connected to the positive DC line 49 and an emitter 77 connected to the negative line 37 in series with resistors 78 and 79 respectively. The transistor 75 has a base 81 coupled through a condenser 82 to the feedback line 74.

Figure 6:
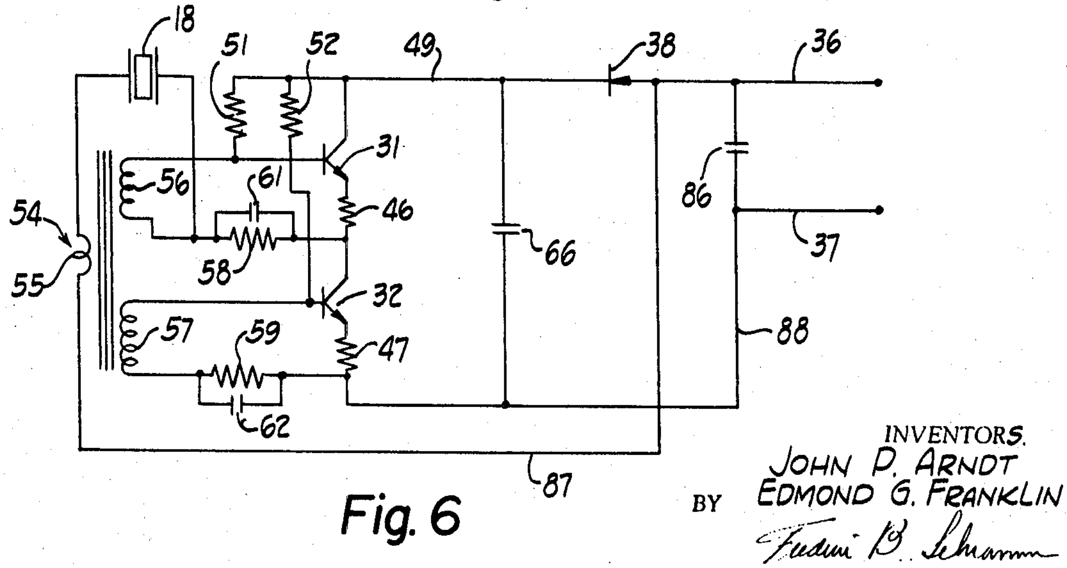

The use of a tank with rounded corners in providing a distribution of energy accomplishes some of the effects of using a frequency modulation system for breaking up energy concentrations. However, actual frequency modulation may be accomplished in a relatively simple manner by taking advantage of the fact that the resonant transducers have a different natural frequency of oscillation for different electrical connections. Thus with the transducer alternately short circuited and shunted by an impedance, it will control circuit oscillation alternately at or near its resonance frequency and at a somewhat different frequency. In the arrangement illustrated in FIG. 6, the impedance shunting the transducer is different when the rectifier 38 is conducting than when the rectifier is not conducting.

Consider first a small increment of time during which the rectifier is conducting 60-Hz. current to charge filter capacitor 66. During this time, conductor 87 is effectively connected to the positive side of filter capacitor 66 and the transducer is terminated by a low impedance circuit which may be traced from the transducer through transformer primary 55, conductor 87, conducting rectifier 38, and then alternately through filter capacitor 66 and transistor 32, and through transistor 31 (alternating at the oscillation frequency) and back to the transducer through capacitor 61 shunted by base resistor 58. Filter capacitor 66 has low impedance at the oscillation frequency and accordingly it makes little difference insofar as terminating impedance is concerned whether transistor 32 is turned on forcing transducer current through capacitor 66, or whether transistor 31 is turned on bypassing capacitor 66.

Now consider the time interval during which rectifier 38 is not conducting due to polarity reversal of the 60 Hz. supply. During this time the circuit across the transducer may be traced from the transducer through transformer primary 55, conductor 87, through bypass capacitor 86 in parallel with the 60-Hz. line, through conductor 88, and then alternately through transistor 32, and through filter capacitor 66 and transistor 31 (alternating at the oscillation frequency) and back to the transducer through capacitor 61 shunted by base resistor 58.

Capacitor 86 may have capacitance about equal to the static capacitance of the transducer or less. In fact, we have successfully operated with capacitor 86 omitted. It can be seen that during the time interval when the rectifier is not conducting, the circuit shunting the transducer includes the high frequency impedance of the 60-Hz. line shunted by capacitor 86, and during the time that the rectifier is conducting, the impedance of the line shunted by capacitor 86 is effectively out of circuit. This alternate exclusion and inclusion of the impedance of the 60-Hz. line shunted by capacitor 86 depending on whether the rectifier is conducting or not, causes frequency modulation of the oscillator at a 60-Hz. rate.

The connection of the transducer to the 60-Hz. line through conductor 87 serves to apply 60-Hz. current to the base of transistor 31 to assist in starting oscillation, replacing capacitor 53 of FIG. 1.

In accordance with the provisions of the patent statutes the principle of operation of the invention has been described together with the apparatus now believed to represent the best embodiment thereof, but it is to be understood that the apparatus shown and described is only illustrative and that the invention may be carried out by other arrangements.

What we claim is:

1. An oscillator comprising in combination a resonant transducer of the type in which impedance becomes a minimum at resonance,
electric power supply terminals,
a pair of transistors connected in series with the power supply terminals, each transistor having an emitter, collector and a base, and
a pair of resistors each connected in series with one of said emitters, and
a feedback transformer having a primary winding and a pair of secondary windings,
the transducer being connected in series with said primary winding between the collector of one of said transistors and the emitter of said transistor in series with its emitter resistor, and the transistors switching when the current in the transducer becomes substantially zero,
the power supply terminals being DC supply terminals.

2. An oscillator as described in claim 1 in which a pair of bias resistors is provided each connected between one of said bases and a power supply terminal.

3. An oscillator as described in claim 2 in which the resistances of the bias resistors are of the order of between 1,000 and 10,000 times the resistances of the emitter resistors.

4. An oscillator as described in claim 3 wherein the resistance of one emitter resistor is greater than that of the other and the resistance of one bias resistor is greater than that of the other.

5. An oscillator comprising in combination a resonant transducer of the type in which impedance becomes a minimum at resonance,
DC electric power supply terminals,
a pair of transistors connected in series with the power supply terminals, each transistor having an emitter, collector and a base, and
feedback coupling means between the transducer and the bases of the transistors,
the transducer being connected in a circuit across one of said transistors,
feedback coupling means between the transducer and the bases of the transistors comprising a transistor circuit with an input from the transducer and an output coupled to the bases of the first-mentioned transistors,
AC terminals in series with a rectifier to provide unidirectional electric power supply to said power supply terminals, and
a starting condenser connected between one of said AC terminals and the base of one of the transistors.

6. An oscillator comprising in combination a resonant transducer of the type in which impedance becomes a minimum at resonance, electric power supply terminals, a pair of transistors connected in series with the power supply terminals, each transistor having an emitter, collector and a base, and the transducer being connected in a circuit across one of said transistors, the power supply terminals being DC supply terminals, wherein AC supply terminals are provided with a rectifier interposed between the AC supply terminals and the DC terminals to provide direct current at the DC terminals and the transducer has a connection on the AC side of the rectifier whereby the rectifier has the effect of alternately opening and closing a circuit in series with the transducer for alternately changing its natural period of oscillation and effecting frequency modulation at the modulation frequency of the AC supply terminals.

7. An oscillator comprising in combination a resonant transducer, electric power supply terminals, and series-connected semiconductor devices of opposite type in circuit with said power supply terminals and said transducer, and means for causing the semiconductor devices to become conducting alternately, said semiconductor devices being actuated by current drawn by said transducer.

8. An oscillator as described in claim 7 wherein the semiconductor devices comprise an NPN transistor and a PNP transistor with bases coupled to the resonant transducer for feedback.

9. An oscillator as described in claim 8 wherein the transistors are connected in series, each having a collector connected to the collector of the other and to the resonant transducer.

UNITED STATES PATENT OFFICE

CERTIFICATE OF CORRECTION

Patent No. 3581125 Dated May 25, 1971

Inventor(s) John P. Arndt and Edmond G. Franklin

It is certified that error appears in the above-identified patent and that said Letters Patent are hereby corrected as shown below:

Column 2, line 26, change "045" to read -- #45 --,
line 27, change "015" to read -- #15 --,
same line, change "045" to -- #45 --.

Column 4, line 67, change the numerals "52" to -- 32 --.

Signed and sealed this 19th day of October 1971.

(SEAL)
Attest:

EDWARD M.FLETCHER,JR.
Attesting Officer

ROBERT GOTTSCHALK
Acting Commissioner of Patents

FORM PO-1050 (10-69)

USCOMM-DC 60376-P69
* U.S. GOVERNMENT PRINTING OFFICE 1969 O—366-334